United States Patent [19]

Murayama et al.

[11] 3,878,274

[45] Apr. 15, 1975

[54] PROCESS FOR PRODUCTION OF POLYVINYLIDENE FLUORINE RESIN FILM

[75] Inventors: Naohiro Murayama; Takao Oikawa, both of Iwaki, Japan

[73] Assignee: Kureha Kagaku Kogyo Kabushiki Kaisha, Tokyo, Japan

[22] Filed: July 21, 1972

[21] Appl. No.: 273,916

[30] Foreign Application Priority Data

July 20, 1971 Japan ............................... 46-53600
July 21, 1971 Japan ............................... 46-53919

[52] U.S. Cl. ..................... 264/2; 260/92.1; 264/24; 264/104; 264/210 R; 264/288

[51] Int. Cl. ............................................ B29d 7/24

[58] Field of Search ... 264/22, 24, 288, 104, 210 R, 264/289, 2; 260/92.1

[56] References Cited

UNITED STATES PATENTS

| | | | |
|---|---|---|---|
| 2,505,146 | 4/1950 | Ryan | 264/2 |
| 3,197,538 | 7/1965 | Capron et al. | 264/288 |
| 3,370,111 | 2/1968 | Boone | 264/289 |
| 3,691,264 | 9/1972 | Asahina | 264/22 |

FOREIGN PATENTS OR APPLICATIONS

| | | | |
|---|---|---|---|
| 1,108,234 | 4/1968 | United Kingdom | 264/288 |

*Primary Examiner*—Jeffery R. Thurlow
*Attorney, Agent, or Firm*—Sughrue, Rothwell, Mion, Zinn and Macpeak

[57] ABSTRACT

Polyvinylidene fluoride resin film having outstanding electric characteristics is produced by uniaxially stretching melt-extruded polyvinylidene fluoride resin sheet having a birefringent index greater than $1.5\times10^{-3}$ towards a direction which is different from winding direction employed in the extruding operation. The uniaxially stretched film thus obtained is put under direct current electric field of 50KV/cm to 2000KV/cm at temperatures between 40°C and 150°C to thereby impart superior piezoelectric or pyroelectric performances.

5 Claims, 1 Drawing Figure

FIG. I
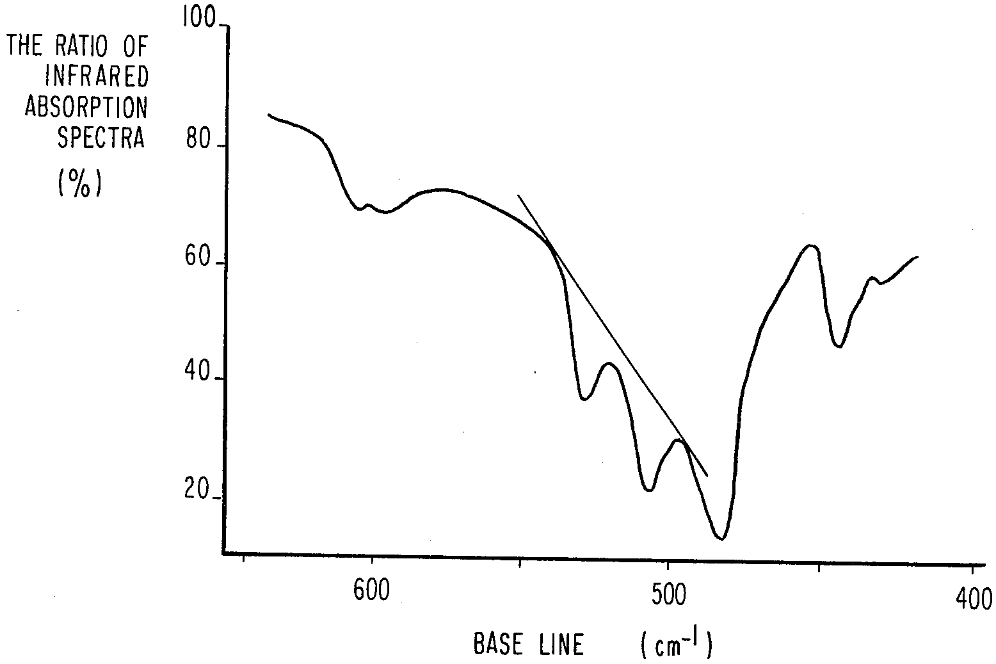

PROCESS FOR PRODUCTION OF POLYVINYLIDENE FLUORINE RESIN FILM

DETAILED DISCLOSURE OF THE INVENTION

The present invention relates to a process for the production of polyvinylidene fluoride resin film having excellent electric and optical characteristics which finds a variety of electric utilities such as in electric capacitors, piezoelectric elements, pyroelectric elements etc. In more particular, it relates to the production of polyvinylidene fluoride resin film having abundant crystal zone of planer zigzag structure.

The present invention is also concerned with a method for obtaining polyvinylidene fluoride resin film having extremely great piezoelectricity and pyroelectricity by poling the film produced according to the above process.

It has been known in the art that polyvinylidene fluoride resin (hereinafter referred to as PVDF resin) has extremely high dielectric constant and can be formed into permanently polarized electret which exhibits outstanding piezoelectric and pyroelectric performances by subjecting it to polarization treatment, for instance, by applying direct current electric field under appropriate conditions. In this case, PVDF mainly possesses two types of crystal structure consisting of α-type crystalline structure (the one in which polymer chain takes TGTG′ conformation structure) and β-type crystalline structure (with planer zigzag structure). It is known that more improved electric performances such as dielectric constant, piezoelectricity, pyroelectricity etc. are obtained if the PVDF resin has abundant portion of β-type crystalline structure.

It has been already proposed, e.g., in Brit. Pat. No. 1,108,234 that the conversion or transformation of α-type crystalline structure into β-type one is effected by imparting orientation to PVDF sheet by means of stretching. However, it is difficult to obtain desirable film having rich content of β-type crystalline structure according to such manner since the degree of transition of the α-type crystal structure into β-type structure is insufficient in usual stretching manner practically available up to the present time in the industry.

The degree of transition of α-type crystal into β-type crystal is increased by using a lower stretching temperature and a higher stretching ratio. However, stretching in high ratio at lower temperature often tends to cause breakage of film, and, even when the stretching is possible to certain degree, the film obtained at such high elogation has only poor tear strength in lateral direction.

According to our investigation, it has been observed that when melt-extruded PVDF resin sheet is more or less drafted during the procedure of sheet forming in which PVDF resin is kept under molten state, the extruded sheet so produced has α-type crystalline orientation. In such a case, it has been particularly difficult to transform the α-type crystal into β-type crystal. In case when extruded sheet is uniaxially stretched in the direction same as that of winding as seen in the conventional manner, only insufficient transition of α-type crystal into β-type crystal is effected because of the influence of the orientation of α-type crystal which has already been present in the extruded sheet in predominant proportion, so that the uniaxially stretched film of PVDF resin thus obtained contains considerable proportion of α-type crystalline zone.

The inventors have now found a fact that the ratio of the content of α-type crystalline structure to that of β-type one in the stretched film can be varied greatly by imparting stretching in different direction upon orientation of the PVDF sheet obtained by melt extrusion. In another word, the content of α-type crystal can be controlled by varying the direction of stretching of melt-extruded PVDF sheet. It is quite surprising that the influence to the crystal structure can be varied greatly by simply changing the direction of stretching.

The object of this invention is to provide a process for the production of uniaxially stretched film having high β-type crystal content. Another object of this invention is to provide a method whereby piezoelectric or pyroelectric film which can be suitably used in a variety of electric elements, is obtained by applying thereto polarization operation.

The process of the present invention comprises stretching melt-extruded PVDF sheet towards a direction different from that of winding upon extrusion (hereinafter referred merely to as winding direction), i.e., to a direction different from that of orientation imparted by drafting.

The present invention will be more fully described hereinbelow:

The thickness of the extruded sheet is usually governed by the quantity of resin extruded and also by the ratio of draft. The less the thickness of the extruded sheet, the greater is the ratio of draft employed which results in greater flow orientation. Therefore, the degree of orientation becomes greater as the thickness of the extruded sheet becomes thinner.

For instance, a birefringent $\Delta n$, which indicates the degree of orientation, of thin sheet sometimes reaches in the vicinity of $30\times10^{-3}$. By stretching thus orientated sheet to a direction perpendicular to the direction of orientation, it is now possible to obtain film having largest content of β-type crystalline structure. The direction of orientation is determined by the direction of draft upon sheet forming. The sheet extruded out of the nozzle of an extruding machine is generally wound under tension and the direction of winding usually agrees with the direction of draft.

The orientated sheet obtained in this way is then subjected to stretching operation.

The stretching is preferably carried out by partially heating PVDF resin sheet, which is inherently crystalline high molecular material, so as to cause necking, for example, by contacting PVDF sheet with a heated roll or partially heating the sheet with infrared lamp.

Suitable stretching temperature is preferably between room temperature and 130°C. The stretching at a temperature exceeding this upper limit will increase difficulty in the transition of α-type crystal to β-type crystal. However, much higher temperature may be employed when using a copolymer of vinylidene fluoride with tetrafluoroethylene or with ethylene fluoride as PVDF resin.

The degree of transition from α-type crystal to β-type crystal becomes greatest when the direction of stretching is set perpendicular to the winding direction and hence most desirable. However, the apparent effect of the process of this invention is observed at a degree within the range of 5° to 90°C so that the direction of the stretching is suitably determined within this range.

The sheet of PVDF to be used in the process of this invention should desirably have some degree of orientation, and that having a birefringent index $\Delta n$ of $1.5\times10^{-3}$ is used preferably. In case when $\Delta n$ is lower than the value of $1.5\times10^{-3}$, the effect for increasing the ratio of $\beta$-type crystal structure to $\alpha$-type structure is not noticed even if the stretching is effected in a direction perpendicular to the winding direction, nor the improvements in piezoelectricity or pyroelectricity are attainable.

Though the upper limit of $\Delta n$ of more than $30\times10^{-3}$ may be obtained, the stretching of the sheet with such a high $\Delta n$ in lateral direction tends to cause tearing and is therefore quite difficult. In general, the value of $\Delta n$ is preferably kept below $20\times10^{-3}$.

The film thus obtained is consisted of an abundant proportion of $\beta$-type crystal. In order to conveniently measure the ratio in the content of $\alpha$-type crystal structure to $\beta$-type crystal structure, the ratio of absorbances D510/D530 calculated out by the degree of infrared absorption spectrum is used as explained in examples shown hereinafter.

The change in the value of D530/D510 is greatly influenced by varying the direction of stretching of PVDF sheet extruded under the same condition. For instance, the value of D530/D510 was 0.21 when a sheet with $\Delta n=10.3\times10^{-3}$ was stretched at the elogation of 3.5 times at 100°C in the direction parallel to that of winding, whereas the value reduces as low as 0.04 when the stretching is effected in the direction perpendicular to that of winding while other condition being kept unchanged. As noted above, the content of $\beta$-type crystal in the extruded sheet varies considerably depending upon the direction of stretching the sheet in the film forming step.

The variation in the directions of stretching also gives appreciable influence to the lateral tear strength of the film, and that obtained after stretching in the direction perpendicular to the winding direction has superior tear strength to that obtained by stretching in the direction parallel to the winding direction.

There are a variety of methods for manufacturing such a thin film containing abundant proportion of $\beta$-type crystal structure which demonstrates excellent characteristics. For example, the stretching of extruded sheet may be effected batchwise, but it can be continuously carried out by using a tenter and the like stretching machine by varying the direction of stretch in different angles from the winding direction.

The PVDF resin to be used in this invention does not only involve homopolymer of vinylidene fluoride but includes also various copolymers of vinylidene fluoride with other monomers capable of copolymerizing therewith so long as the copolymer contains more than 90% by weight of vinylidene fluoride and as far as it has substantially the same crystalline structure as that of the homopolymer.

Typical examples of other monomers to be copolymerized with vinylidene fluoride are tetrafluoroethylene, trifluoroethylene, vinyl fluoride, monochlorotrifluoroethylene, hexafluoropropylene, ethylene, propylene, and the like monomers capable of being copolymerized with vinylidene fluoride.

The resulted film rich in $\beta$-type crystalline zone exhibits high dielectric constant and suitably used as a capacitor film of excellent quality. Moreover, the film so obtained can be further polarized into electret to thereby impart high piezoelectricity and pyroelectricity.

One of the most general method of polarization comprises application of direct current electric field under elevated temperature and subsequent cooling.

When applying such polarization treatment onto two types of film each differing in the direction of stretching as set forth previously, the one to which parallel stretching direction has been applied showed a value of $d_{31}$ at maximum of $10^{-7}$ cgsesu whereas that stretched in perpendicular direction exhibited $d_{31}$ of $10^{-6}$ cgsesu.

By the "piezoelectricity" used throughout the present invention is meant a piezoelectric character upon drawing, which is obtained by measuring the piezoelectricity in the manner as follows:

In case when the film is drawn, and the direction of drawing is given as Z axis and that of the plane perpendicular to Z axis is given as X axis, the piezoelectricity of X axis direction is measured as piezoelectricity and the piezoelectric constant at this instance is expressed as $d_{31}$. There also exists other non-zero value constants, such as $d_{33}$ and $d_{32}$ accompanied with $d_{31}$ among the piezoelectric constants. There may be one having a value as great as $d_{31}$, and the utility of which in other particular purposes may of course be taken into consideration as well.

The condition under which the polarization treatment is carried out includes the intensity of direct current field to be applied and the temperature used. The piezoelectricity and pyroelectricity of PVDF resin electret are determined by the combination of the above two conditions. According to our investigations, the effect of polarization becomes evident at the direct current electric field intensity of 50 KV/cm to 2000 KV/cm and at temperatures between 40° and 150°C, and it is under such condition that satisfactory characteristics of the electret for practical uses are obtained.

In case either when the intensity of the direct current electric field exceeds 2000 KV/cm or when the temperature is above 150°C, there occurs breakage in insulation and the electretization becomes no more practically possible. However, the use of both field intensity and temperature as high as possible is desirable so as to obtain a product having greater piezoelectricity and pyroelectricity. In this viewpoint, the direct current electric field of the intensity above 300 KV/cm and temperature in excess of 70°C are desirable.

According to prior processes, it has been inevitable to use thin extruded sheet as the material in order to obtain thin PVDF film haviing rich $\beta$-type crystal content because only a limited stretching ratio is attainable at lower temperature, and therefore it has been difficult to obtain film with high content in $\beta$-type crystal.

In accordance with the process of this invention, however, it is now possible to readily obtain very thin PVDF film having rich $\beta$-crystal content.

Utilizing such an advantageous feature of the present invention, the thin PVDF film obtained according to the present invention can be used as piezoelectric element in electricacoustic energy conversion units or as pyroelectric material in thermosensitive elements with high sensitivity for the variation in temperature.

The present invention is explained in greater detail by the following examples and by referring to the attached drawing.

Example 1

Powder of PVDF resin obtained by suspension polymerization procedure was extruded and formed into a plurality of sheets having thickness of 33$\mu$, 60$\mu$, 100$\mu$, and 200$\mu$ respectively.

The birefringent index $\Delta n$ of these sheets were measured by the use of a polarizing microscope using white light as the light source. Each of these sheets was then stretched at the elongation of 3.5 times by contacting with a roll heated at 100°C. The stretching was effected in two ways in which the one was carried out in perpendicular direction to winding direction (A), and the other in parallel to the winding direction (B).

The ratio of infrared absorption spectra were calculated out with respect to each sample film by measuring the absorption at 510cm$^{-1}$, originated from $\beta$-type crystal, and at 530cm$^{-1}$, originated from $\alpha$-type crystal, from which $D_{530}/D_{510}$ was determined as a proportion of $\beta$-type crystalline region in the both films.

The way of drawing the base line upon calculating $D_{530}/D_{510}$ in the examples is illustrated in FIG. 1, which illustrates infrared absorption spectra upon calculation of $D_{530}/D_{510}$ and an example of base line. According to FIG. 1, the base line was drawn as a tangent line onto the absorption curves between 500cm$^{-1}$ and in the vicinity of 545cm$^{-1}$.

In addition, the dielectric constant $\epsilon$ was measured as to respective sample of the film. This measurement of dielectric constant was conducted at room temperature and at the frequency of 1 KHz.

The results of measurement are given in the following table.

| No. | Thickness of sheet ($\mu$) | $\Delta n$ of sheet ($\times10^{-3}$) | $D_{530}/D_{510}$ of Sample A | $D_{530}/D_{510}$ of Sample D | $\epsilon$ of Sample A | $\epsilon$ of Sample B |
|---|---|---|---|---|---|---|
| 1 | 33 | 10.3 | 0.04 | 0.21 | 15.5 | 11.3 |
| 2 | 60 | 8.23 | 0.02 | 0.19 | 16.2 | 11.3 |
| 3 | 100 | 4.64 | 0.08 | 0.20 | 14.8 | 11.3 |
| 4 | 200 | 2.24 | 0.10 | 0.15 | 13.0 | 12.5 |

These films were then subjected to polarization treatment by applying direct current electric field with the use of aluminum deposited film, then piezoelectric constant ($d_{31}$) was measured.

The polarization treatment was applied at a temperature of 90°C with direct current voltage corresponding to the electric field intensity of 700KV/cm for the period of 30 minutes.

The result is given in the following table.

| No. | $d_{31}$ of Sample A ($\times10^{-7}$ cgsesu) | $d_{31}$ of Sample B ($\times10^{-7}$ cgsesu) |
|---|---|---|
| 1 | 8.2 | 1.7 |
| 2 | 9.9 | 1.5 |
| 3 | 3.7 | 1.4 |
| 4 | 2.4 | 2.0 |

Example 2

Extruded sheet with the thickness of 60$\mu$ employed in Example 1 was stretched at the elongation of 3.5 times by contacting with a roll heated at 100°C. The direction of stretching was set in the angle of 0°, 30°, 60° and 90° respectively, and the relationship between the direction of stretch and piezoelectricity generated after the polarization treatment, which was effected under the same condition as used in Example 1, was investigated.

The results is given in the table below.

| Angles of stretching against extruding direction | Piezoelectric constant after subjecting to the above treatment |
|---|---|
| 0° | $1.5 \times 10^{-7}$ cgsesu |
| 30° | $2.5 \times 10^{-7}$ cgsesu |
| 60° | $5.0 \times 10^{-7}$ cgsesu |
| 90° | $9.9 \times 10^{-7}$ cgsesu |

Example 3

Extruded PVDF sheet of 30$\mu$ in thickness used in Example 1 was stretched at the elongation of 3.5 times by contacting with a roll heated at 100°C.

The direction of stretch was set each at the angle of 0° and 90° against the direction of extrusion, and the comparison of piezoelectricity between them was investigated after polarization treatment which was effected under the same condition as that employed in Example 1 except that the direct current electric field applied was 400KV/cm. Each of the polarized sample was then wrapped in aluminum foil and the both terminals were shortcircuited to remove unstable depolarized current, thereafter heat-treated at 70°C for an hour.

The result of the measurement of pyroelectric current is given in the table below.

| Samples | Pyroelectricity at 50°C (coulomb/deg.cm) |
|---|---|
| A | $1.0 \times 10^{-8}$ |
| B | $0.53 \times 10^{-8}$ |

Sample A: The one stretched in perpendicular direction to the extruding direction with the subsequent treatment as described above.
Sample B: The one stretched in parallel direction to the extruding direction with the above subsequent treatment. (as contrast)

Example 4

A copolymer of vinylidene fluoride with vinyl fluoride in the monomer charge ratio of 95:5 was extrusion-molded into sheet of 30$\mu$ in thickness. The sheet was stretched at an elongation of about 3 times to give two sample sheets in which Sample A was stretched in parallel direction to the extruding direction and Sample B was stretched in perpendicular direction to the extruding direction. The stretching was effected with the use of a roller heated at 130°C. The resulted sample films were then subjected to polarization treatment by applying thereto direct current electric field by the use of aluminum depositted electrodes to thereby measure piezoelectric constant ($d_{31}$). The result is given in the table below.

The polarization treatment was effected at 150°C at the field intensity of 200KV/cm.

| Samples | $d_{31}$ (cgsesu) |
|---|---|
| A | $1.0 \times 10^{-7}$ |
| B | $3.5 \times 10^{-7}$ |

Example 5

In a similar manner to Example 4, the experiment was carried out by the use of a copolymer of tetrafluorovinyl with vinylidene fluoride in the monomer charge ratio of 5:95. The result is given in the table below.

| Samples | $d_{31}$ (cgsesu) |
|---|---|
| A | $2.0 \times 10^{-7}$ |
| B | $6.3 \times 10^{-7}$ |

What is claimed is:

1. A process for the production of a vinylidene fluoride resin film useful in electric uses, which comprises extruding and winding a sheet of polyvinylidene fluoride resin under conditions to produce an extruded sheet having a birefringent index between $1.5 \times 10^{-3}$ and $30 \times 10^{-3}$ and then uniaxially stretching said extruded sheet of polyvinylidene fluoride resin in the direction which is 5° to 90° from the direction of winding in the extruding step.

2. The process of claim 1 in which the film is used in a capacitor, piezoelectric element or pyroelectric element film.

3. A process of claim 1 in which the polyvinylidene fluoride resin is homopolymer of vinylidene fluoride or a copolymer consisting of at least 90% by weight of vinylidene fluoride and at least one of monomers capable of being copolymerized with vinylidene fluoride.

4. A method of producing piezoelectric and pyroelectric polyvinylidene fluoride resin film which comprises extruding and winding a sheet of polyvinylidene fluoride resin under conditions to produce an extruded sheet having a birefringent index between $1.5 \times 10^{-3}$ and $30 \times 10^{-3}$ and then uniaxially stretching said extruded sheet of polyvinylidene fluoride resin in a direction which is 5° to 90° from the direction of winding in the extruding step, thereafter applying to the resulted film a direct current electric field of an intensity of 50 KV/cm to 2000 KV/cm while heating at a temperature of 40° to 150°C.

5. The process of claim 1 wherein the birefringent index of said extruded sheet is up to $20 \times 10^{-3}$.

* * * * *